United States Patent
Taylor

(10) Patent No.: US 6,191,264 B1
(45) Date of Patent: Feb. 20, 2001

(54) REACTIVE DISAZO DYES

(75) Inventor: John Anthony Taylor, Manchester (GB)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/554,324

(22) PCT Filed: Nov. 17, 1998

(86) PCT No.: PCT/GB98/03460

§ 371 Date: Jun. 6, 2000

§ 102(e) Date: Jun. 6, 2000

(87) PCT Pub. No.: WO99/25772

PCT Pub. Date: May 27, 1999

(30) Foreign Application Priority Data

Nov. 17, 1997 (GB) .................................................. 9724288

(51) Int. Cl.⁷ .............................. C09B 62/09; D06P 1/382
(52) U.S. Cl. .......................... 534/634; 534/605; 534/612
(58) Field of Search .............................................. 534/634

(56) References Cited

FOREIGN PATENT DOCUMENTS

120807 * 10/1984 (EP).
122423 * 10/1984 (EP).
170612 *  2/1986 (EP).
478504 *  4/1992 (EP).

* cited by examiner

*Primary Examiner*—Fiona T. Powers

(74) *Attorney, Agent, or Firm*—Oblon, Spivak, McClelland, Maier & Neustadt, P.C.

(57) ABSTRACT

Reactive disazo dyes of the formula (1)

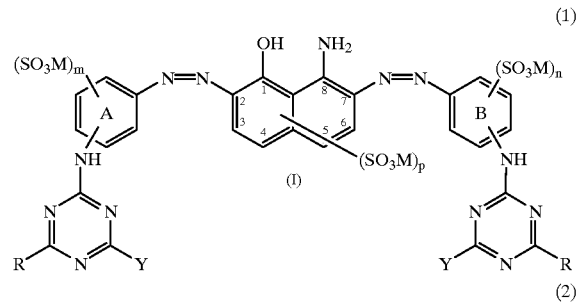

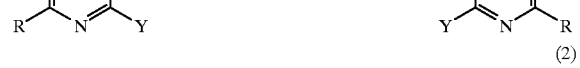

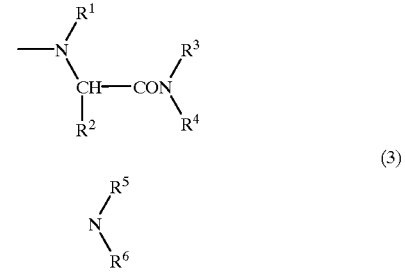

wherein each R independently is $R^A$ or $R^B$ where $R^A$ is a group of the formula (2), $R^B$ is a group of the formula (3) in which $R^1$, $R^2$, $R^3$, $R^4$, $R^5$ and $R^6$ are as defined in the description and Y is a labile atom or group. The dyes may be used for dyeing, printing or ink-jet printing of textile materials, leather, paper, coated paper, hair or film.

12 Claims, No Drawings

REACTIVE DISAZO DYES

This invention relates to disazo dyes containing reactive triazinylamino groups, which disazo dyes include a dyebase having a central 1-hydroxy-8-aminonaphthalenesulphonic acid and terminal respective benzene nuclei each carrying a triazinylamino group.

Such dyes are disclosed, for example, in each of GB-A-2162193, U.S. Pat. No. 5,073,631, EP-A-0122423 and EP-A- 0478504.

Dyes disclosed in U.S. Pat. No. 5,073,631 contain amino groups substituted on each respective triazinyl group, each of which amino groups may be substituted by one or two of optionally substituted alkyl, cycloalkyl, arylalkyl and aryl groups, which optional substituent is selected from a wide range thereof, including carbamoyl. There is a general disclosure of a range of dyes containing a carbamoyl substituted phenyl group. EP-A-0478504 discloses a wide range of dyes, some of which contain amino groups substituted on each respective triazinyl group, each of which amino groups may be substituted by an acylaminoalkyl group. In the dyes of GB-A-2162193 and EP-A-0122423, each triazinyl group is again substituted by an amino group, which may bear any of a wide range of substituents.

We have now found surprisingly that, in such dyes as mentioned above, if at least one triazinylamino group carries on the triazinyl nucleus a carbamoyl alkylamino group, then the resultant dyes have excellent build up, good fastness properties and compatibility with related dyestuffs.

Thus, according to the present invention, there is provided a dye of the formula (I)

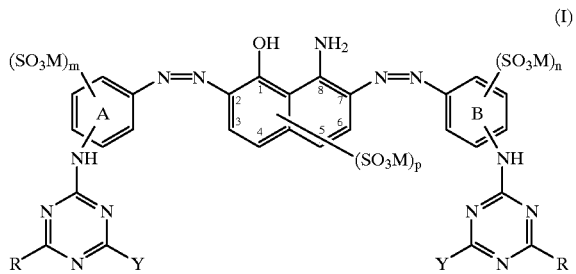

wherein:

each R, independently, is $R^A$ or $R^B$, where RA is a group

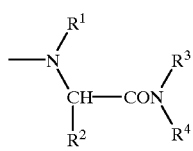

in which each of $R^1$, $R^2$, $R^3$ and $R^4$, independently, is a hydrogen atom or an optionally substituted $C_{1-4}$ alkyl group;

$R^B$ is a group

in which:

$R^5$ is a hydrogen atom or an optionally substituted $C_{1-4}$ alkyl group or an optionally substituted phenyl or naphthyl group;

$R^6$ is a hydrogen atom or an optionally substituted $C_{1-4}$ alkyl group or an optionally substituted phenyl or naphthyl group or is a group $NR^5R^7$;

where $R^5$ is as defined above; and $R^7$ is a hydrogen atom or an optionally substituted $C_{1-4}$ alkyl group or is a group of the formula:

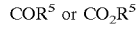

where $R^5$ is as defined above, or $R^5$ and $R^6$, together with the nitrogen atom to which they are attached, form a ring;

at least one R is a group $R^A$;

when each R is $R^A$, each $R^A$ may be the same as or different from the other;

each Y, independently, is a labile atom or group; each of m, n and p, independently is zero, 1 or 2; and $SO_3M$ is a sulphonic acid group or salt thereof.

In the above formula, preferably, each R is a group $R^A$.

In addition, whether the dye contains one group, or two groups, $R^A$, it is preferred that $R^A$ is:

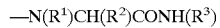

wherein each of $R^1$, $R^2$ and $R^3$ is as defined above.

Typical preferred examples of $R^A$ are —$NHCH_2CONH_2$, —$NR^8CH_2CONH_2$, —$NHCH_2CONHR^8$, —$NHCH(R^8)CONH_2$, —$NR^8CH_2CONHR^9$, —$NR^8CH(R^9)CONH_2$, —$NHCH(R^8)CONHR^9$, —$NR^8CH(R^9)CONHR^{10}$, more preferably —$NR^8CH^2CONHR^9$, and even more preferably —$NR^8CH_2CONHR^8$, where $R^8$, $R^9$, $R^{10}$ are independently optionally substituted $C_{1-4}$ alkyl, especially methyl or ethyl.

Where a particular triazinylamino group does not include a group $R^A$, then R is a nitrogen-linked group —$NR^5R^6$ such as that derived from an alkylamine, an arylamine, or a substituted hydrazine derivative. In alkylamine-derived groups, $R^5$ and $R^6$ are independently a hydrogen atom or an optionally substituted $C_{1-4}$ alkyl group, or $R^5$ and $R^6$ are part of a ring. In arylamine-derived groups, $R^5$ is as defined above and $R^6$ is an optionally substituted phenyl or naphthyl group. In hydrazine-derived groups, $R^5$ is as defined above and $R^6$ is $NR^5R^7$ where $R^5$ is as defined above and $R^7$ is a hydrogen atom or optionally substituted $C_{1-4}$ alkyl group or is of the formula —$COR^5$ or —$CO_2R^5$ where $R^5$ is as defined above.

Any alkyl group of $R^1$–$R^{10}$ is optionally substituted by a $C_{1-4}$ alkoxy group such as methoxy, ethoxy, propoxy, isopropoxy or butoxy, a $C_{2-4}$ alkanoylamino group such as acetylamino, propionylamino or butyrylamino, a $C_{1-4}$ alkoxycarbonyl group such as methoxycarbonyl or ethoxycarbonyl, an amino group optionally substituted by one or two $C_{1-4}$ alkyl group(s) such as amino, methylamino, ethylamino, propylamino, isopropylamino or butylamino, a $C_{1-4}$ alkylsulphonyl group such as methylsulphonyl or ethylsulphonyl, trifluoromethyl, nitro, cyano, halogen, such as fluorine, chlorine or bromine, carbamoyl, N-($C_{1-4}$ alkyl) carbamoyl such as N-methylcarbamoyl or N-ethylcarbamoyl, sulfamoyl, N-($C_{1-4}$ alkyl)sulfamoyl such as N-methylsulfamoyl, N-ethylsulfamoyl, N-propylsulfamoyl, N-isopropylsulfamoyl or N-butylsulfamoyl, ureido, hydroxy, carboxy, sulfomethyl or sulfo. Especially preferred such substituents are methoxy, ethoxy, acetylamino, chlorine, bromine, ureido, hydroxy, carboxy, sulfomethyl and sulfo.

By labile atom or group is meant an atom or group which is bound by a chemical bond to the triazine nucleus, which atom or group is displaceable by a hydroxyl group of cellulose under mildly alkaline aqueous conditions to form a covalent bond between the triazine nucleus and cellulose. As examples of such atoms or groups there may be mentioned halogen atoms, for example F and Cl; sulphonic acid groups; thiocyano groups; quaternary ammonium groups, for example trialkylammonium groups and optionally substituted pyridinium groups, for example 3- and 4-carboxy pyridinium groups. A most preferred labile atom is a halogen atom, especially Cl or F.

In the chromophore, the naphthalene nucleus preferably contains two sulphonic acid groups and, more preferably, one such group is at the 3- position and the other is at the 5- or 6-position.

In each of the benzene nuclei A and B, it is preferred that at least one sulphonic acid group or salt thereof is present on each nucleus.

Additionally, as shown in formula (I), each of the benzene nuclei A and B independently is substituted by a substituted triazinylamino group as defined above.

Furthermore, each of nuclei A, B and any phenyl or naphthyl group on $R^5$ or $R^6$, independently, is optionally substituted, for example, by a $C_{1-4}$ alkyl group, such as methyl, ethyl, propyl, isopropyl or butyl, a $C_{1-4}$ alkoxy group such as methoxy, ethoxy, propoxy, isopropoxy or butoxy, a $C_{2-4}$ alkanoylamino group such as acetylamino, propionylamino or butyrylamino, a $C_{1-4}$ alkoxycarbonyl group such as methoxycarbonyl or ethoxycarbonyl, an amino group optionally substituted by one or two $C_{1-4}$-alkyl group(s) such as amino, methylamino, ethylamino, propylamino, isopropylamino or butylamino, a $C_{1-4}$ alkylsulphonyl group such as methylsulphonyl or ethylsulphonyl, trifluoromethyl, nitro, cyano, halogen, such as fluorine, chlorine or bromine, carbamoyl, N-($C_{1-4}$ alkyl)carbamoyl such as N-methylcarbamoyl or N-ethylcarbamoyl, sulfamoyl, N-($C_{1-4}$ alkyl)sulfamoyl such as N-methylsulfamoyl, N-ethylsulfamoyl, N-propylsulfamoyl, N-isopropylsulfamoyl or N-butylsulfamoyl, ureido, hydroxy, carboxy, sulfomethyl or sulfo. Especially preferred such substituents are methyl, ethyl, methoxy, ethoxy, acetylamino, chlorine, bromine, ureido, hydroxy, carboxy, sulfomethyl and sulfo.

An especially preferred range of dyes has the formula (II)

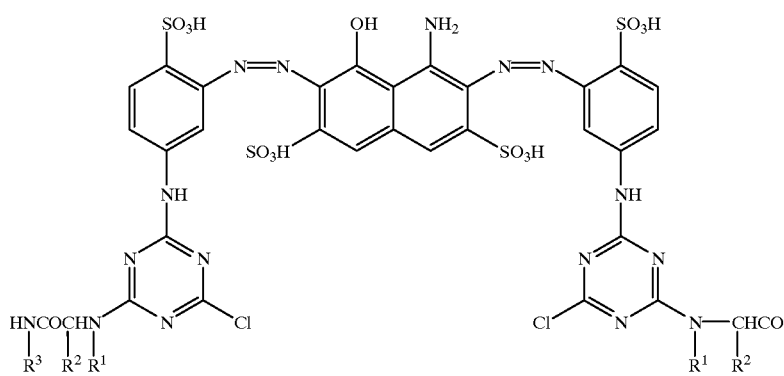

(II)

wherein $R^1$, $R^2$ and $R^3$ are as defined above.

A dye of the formula (I) in which each R is a group $R^A$ can be prepared by a method which comprises:

reacting a dyebase of the formula (III)

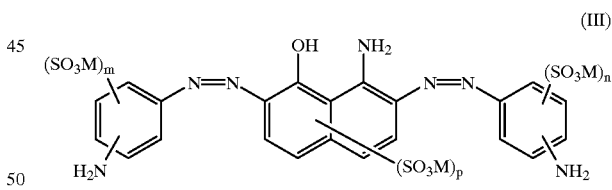

(III)

wherein $SO_3M$, m, n and p are as defined in above, with a triazine of the formula (IV)

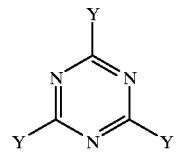

(IV)

where Y is as defined above, to form a bis-triazinylamino dye of the formula (V)

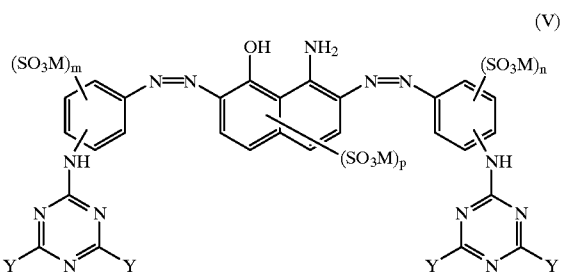

(V)

wherein SO₃M, m, n, p and Y are as defined above, and then reacting the bis-triazinylamino dye (V)
with a carbamoylalkylamine of the formula (VI)

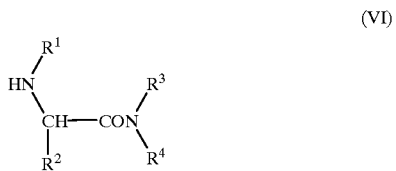

(VI)

wherein $R^1$, $R^2$, $R^3$ and $R^4$ are as defined above.

An especially preferred triazine of the formula (IV) is cyanuric chloride or fluoride.

Especially preferred carbamoylalkylamines of the formula (VI) are glycinamide, preferably in the form of a salt thereof, especially the hydrochloride; and N,N'-dialkyl derivatives of glycinamide and their hydrochloride salts.

The dyebase of the formula (III) may itself be prepared by acid coupling with a diazotised amine, providing nucleus B, with a hydroxynaphthylamine compound and then coupling in a neutral or basic solution a diazotised amine, providing the nucleus A, with the resultant product.

In an alternative method, 2 mols of the triazine (IV) are condensed with 2 mols of the carbamoylalkylamine (VI) to provide a primary condensation product which is then condensed with 1 mol of the disazo dyebase (III).

In another alternative, 2 mols of the triazine (IV) and 2 mols of a phenylenediamine compound providing the benzene nuclei A and B are condensed with one another to form a primary condensation product, after which the carbamoylalkylamino compound (VI) is condensed onto each respective triazinylamino group and the resultant secondary condensation product diazotised and coupled firstly in acid solution, then in neutral or basic solution with the hydroxynaphthylamine compound.

In yet another alternative, 2 mols of the triazine (IV) are condensed with 2 mols of the phenylenediamine compound providing nuclei A and B to form a primary condensation product which is then diazotised and coupled, firstly in acid solution and then in neutral or basic solution with 1 mol of the hydroxynaphthylamine compound, after which the secondary condensation product is reacted with 2 mols of the carbamoyl alkylamine (VI).

A dye of the formula (I) wherein each R is $R^A$ and each $R^A$ is different, one from the other, may be prepared by any of the above methods modified by replacing 2 mols of (VI) by 1 mol of each of two different carbamoylalkylamines.

A dye of the formula (I) wherein one R is $R^A$ and one R is $R^B$ can be prepared by any of the above methods modified by replacing 2 mols of (VI) with 1 mol of (VI) plus 1 mol of (VII)

(VII)

where $R^5$ and $R^6$ are as defined above.

In the above reactions where a group derived from (VII) is included in the product, the reaction of (VII) can precede or succeed that with (VI), or the reaction with (VI) and (VII) can be simultaneous. However, to avoid mixtures it is preferred that (VI) and (VII) are reacted independently with the product of reaction between triazine (IV) and a phenylenediamine compound providing each of the benzene nuclei A and B (or two phenylenediamine compounds providing respective nuclei A and B), and the two products are independently diazotised and coupled with the naphthalene coupling component, one coupled acid, the other coupled neutral or basic. In this way a unique product is obtained in which the two different R substituents in (I) are clearly distinguished.

A dye (I) in which the labile group Y is a quaternary ammonium group may be prepared by a further reaction step between a dye (I) in which Y is halogen with a free amine such as 1,4-diazabicyclononane (DABCO) or 3- or 4-carboxypyridine, or 3- or 4-carbonamidopyridine.

In the above reactions, the preferred coupling components are 1-hydroxy-8-aminonaphthalene-3,6-disulfonic acid (H-acid) and 1-hydroxy-8-aminonaphthalene-3,5-disulfonic acid (K-acid).

Diazotisable compounds which may be used are 1,5-diaminobenzene-2-sulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 1,4-diaminobenzene-2-carboxylic acid, 1,3-diaminobenzene-4-carboxylic acid, 1,3-diaminobenzene-5-carboxylic acid, 1-amino-4-methoxy-5-aminomethylbenzene-6-sulfonic acid, 1-amino-3-nitrobenzene-6-sulfonic acid, 1-amino-4-nitrobenzene-6-sulfonic acid, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-methyl-5-methoxybenzene, 1,4-diamino-2,5-dimethoxybenzene, 1,4-diamino-2,5-diethoxybenzene, 1,3-diamino-2,4,6-trimethylbenzene, 1,4-diamino-2,3,5,6-tetramethylbenzene and 1,3-diamino-4-nitrobenzene.

The invention includes dyes and processes using dyes in either the free sulphonic acid, or sulphonate salt, form, particularly their salts with alkali metals such as the potassium, sodium, lithium or mixed sodium/lithium salt.

The dyes may be used for dyeing, printing or ink-jet printing, for example, of textile materials and paper, including coated paper.

The process for colouration is preferably performed at a pH of 7.1 to 13, more preferably 10 to 12. pH levels above 7 can be achieved by performing the process for colouration in the presence of an acid- binding agent.

The substrate may be any of a textile material, leather, paper, coated paper, hair or film, but is preferably a natural or artificial textile material containing amino or hydroxyl groups, for example textile materials such as wool, silk, polyamides and modified polyacrylonitrile fibres, and more preferably a cellulose, for example, mercerised or unmercerised cotton and its blends, for example with polyester, and that commercially available as Tencel. For this purpose the dyes can be applied to the textile materials at a pH above 7 by, for example, exhaust dyeing, padding or printing. Textile materials are coloured navy or dark green shades and possess good fastness to light and wet treatments such as washing.

The new dyes are particularly valuable for colouring cellulosic textile materials. For this purpose, the dyes are preferably applied to the cellulosic textile material at a pH above 7 in conjunction with a treatment with an acid-binding agent.

Preferred acid-binding agents include alkali metal carbonates, bicarbonates, hydroxides, metal silicates and mixtures thereof, for example sodium bicarbonate sodium carbonate, sodium metasilicate, sodium hydroxide and the corresponding potassium salts. The dyes benefit from excellent build-up and high fixation.

At least for cellulosic materials, dyeing may be carried out at a somewhat higher temperature of about 90° C., as compared with dyeing carried out with conventional exhaust dyes which are generally dyed at a lower temperature. In this manner, particularly improved migration is obtained.

The new dyes can be applied to textile materials containing amine groups, such as wool and polyamide textile materials, from a neutral to-mildly alkaline dyebath. The dyeing process can be carried out at a constant or substantially constant pH, that is to say that the pH of the dyebath remains constant or substantially constant during the dyeing process, or if desired the pH of the dyebath can be altered at any stage of the dyeing process.

The dyes may be in liquid or solid form, for example in granular or powdered form.

We find surprisingly that such dyes provide excellent build-up at 80° C., 90° C. and 100° C., have good fastness properties and are very compatible with related dyestuffs, especially certain selected red and yellow dyes.

Such dyes additionally provide the following advantageous properties:

a) very strong dyeing;

b) good robustness to changes in dyeing conditions, especially temperature;

c) good wash off;

d) good fixation; and e) good aqueous solubility.

Embodiments of the invention will now be described in more detail with reference to the following Examples.

EXAMPLE 1

A dyebase (20) (MI 930.1;14.0g; 15 mmols) was dissolved in 100 mls of cold water. Separately, cyanuric chloride (21) (Fluka 6.1 g, 0.033 mols) was dissolved in 60 mls acetone and poured onto 150 g ice with 3 drops of Calsolene oil to form a fine white suspension. To this was added dropwise, the above dyebase solution, while keeping the temperature at less than 0° C. and pH 6–6.5 by dropwise addition of 2N $Na_2CO_3$. After completion of the addition, the temperature was sustained at less than 0° C. and the pH at 6–6.5, with stirring. Stirring was then continued at 0–5° C. for one hour and unreacted cyanuric-chloride was screened off to obtain a bis(dichlorotriazinylamino) dye (22). The resulting mixture was stirred at room temperature and a solution of glycinamide hydrochloride (23) (ex Aldrich, 3.7 g, 0.033 mols) in 20 mls of water was added dropwise, after which the mixture was stirred at 30-35° C. and pH7.0 for two hours. Since thin layer chromatography (tlc) indicated that the reaction was incomplete (even thought the pH had stopped dropping), a further 1.0 g (8.86 mmols) of glycinamide hydrochloride was added and the mixture stirred at 30° C., pH6.8–7 for one hour and then again at room temperature and pH7–7.5. Since some of the final product was not in solution, the mixture was diluted up to 1000 mls with water and stirred at pH6.5–7.0 and 35–40° C. until dissolved. After confirmation by tlc that the reaction had been completed, the reactive dye was allowed to settle out by addition of 5%w/v aqueous potassium chloride solution. The mixture was stirred for two hours, filtered and the residue dried in a fan oven at 40° C. to yield 15.7 g of navy reactive dye (1) ($\lambda_{MAX}$=608 nm; $\epsilon_{MAX}$=49700; $\lambda_{1/2}$= 108 nm)

The above reaction may be represented by

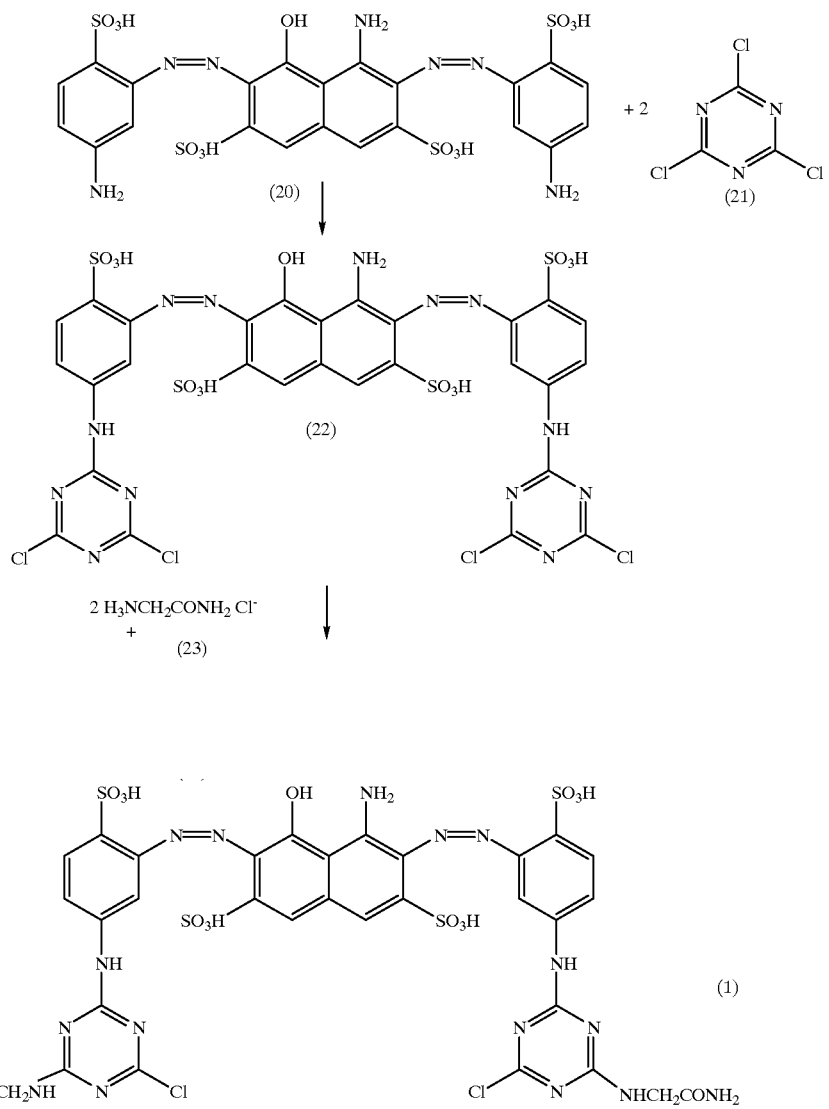

EXAMPLES 2–11

The method of Example 1 was applied to different respective glycinamide derivatives to give the products summarised in the following Table where $R^1$, $R^2$, and $R^3$ are substituents as shown in formula (II).

| Example | $R^1$ | $R^2$ | $R^3$ | Shade | $\lambda_{max}$ | $\epsilon_{max}$ | $\lambda_{\frac{1}{2}}$ |
|---|---|---|---|---|---|---|---|
| 2 | i-Pr | H | H | navy | 607 | 53000 | 108 |
| 3 | Me | H | H | navy | 608 | 49000 | 108 |
| 4 | Et | H | H | navy | 608 | 50500 | 108 |
| 5 | Et | Me | H | navy | 607 | 56000 | 107 |
| 6 | Me | Me | H | navy | 607 | 53500 | 114 |
| 7 | Me | H | Me | navy | 607 | 48500 | 108* |
| 8 | Me | H | Et | navy | 607 | 48500 | 107 |
| 9 | H | H | Me | navy | 607 | 44500 | 106 |
| 10 | Et | H | Et | navy | 609 | 45500 | 110 |
| 11 | Et | H | Me | navy | 606 | 47000 | 115 |

*especially preferred

In the above Table, Me=methyl, Et=ethyl and i-Pr=isopropyl.

EXAMPLE 12

The method of Example 1 was repeated except that the dyebase (22) was replaced by dyebase (24):

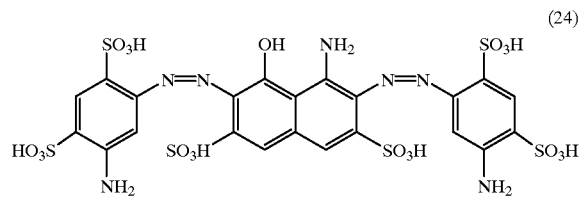

The resultant product was a navy dye (12) ($\lambda_{MAX}$=616 nm, $\epsilon$=53800; $\lambda_{1/2}$=114 nm)

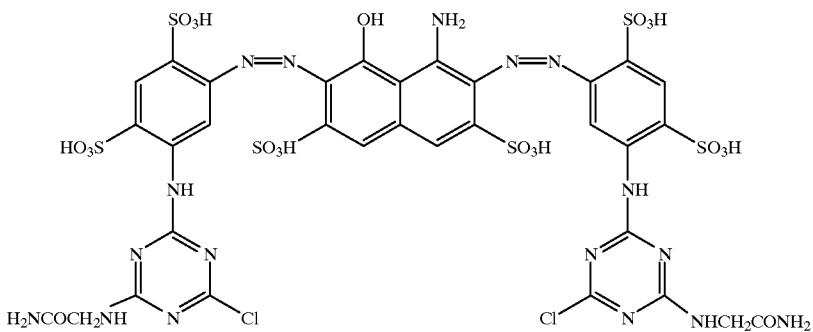

(12)

EXAMPLE 13

The method of Example 12 was repeated, except that the glycinamide hydrochloride (23) was replaced by N-ethyl glycinamide hydrochloride to provide a navy dye (13) ($\lambda_{MAX}$=612 nm, $\epsilon$=45000; $\lambda_{1/2}$=119 nm):

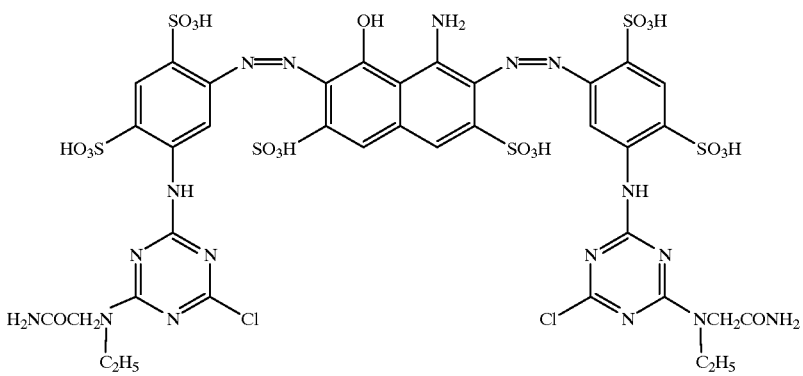

(5)

EXAMPLE 14

The dyes prepared in Examples 1–13 were applied to cotton by exhaust dyeing at 80° C., 90° C. and 100° C., at a liquor:goods ratio of 10:1 and in the presence of salt and soda ash. In each case, the dye was found to have excellent build-up and good fastness properties.

What is claimed is:

1. A dye of the formula (I)

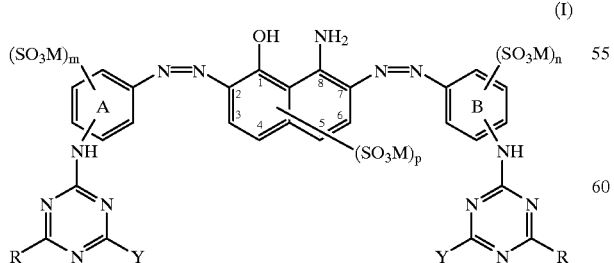

(I)

wherein:

each R, independently, is $R^A$ or $R^B$, where $R^A$ is a group

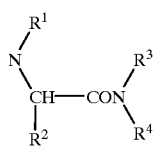

in which each of $R^1$, $R^2$, $R^3$ and $R^4$, independently, is a hydrogen atom or a $C_{1-4}$ alkyl group;

$R^B$ is a group

in which:

$R^5$ is a hydrogen atom or an optionally substituted $C_{1-4}$ alkyl group or an optionally substituted phenyl or naphthyl group;

$R^6$ is a hydrogen atom or an optionally substituted $C_{1-4}$ alkyl group or an optionally substituted phenyl or naphthyl group or is a group $NR^5R^7$;

where $R^5$ is as defined above; and $R^7$ is a hydrogen atom or an optionally substituted $C_{1-4}$ alkyl group or is a group of the formula:

$$COR^5 \text{ or } CO_2R^5$$

where $R^5$ is as defined above, or $R^5$ and $R^6$, together with the nitrogen atom to which they are attached, form a ring;

at least one R is a group $R^A$;

when each R is $R^A$, each $R^A$ may be the same as or different from the other;

each Y, independently, is a labile atom or group;

each of m, n and p, independently is zero, 1 or 2;

$SO_3M$ is a sulphonic acid group or salt thereof; and each ring A and B, independently, is additionally optionally substituted.

2. A dye according to claim 1, wherein each R is a group $R^A$.

3. A dye according to claim 1, wherein the or each $R^A$ is a group of the formula $$-N(R^1)CH(R^2)CONH(R^3)$$

wherein each of $R^1$, $R^2$ and $R^3$ is as defined in claim 1.

4. A dye according to claim 1, wherein each Y is a fluorine or chlorine.

5. A dye according to claim 1, wherein p is 2 and one group $SO_3M$ is at the 3-position and the other is at the 5- or 6- position.

6. A dye according to claim 1, wherein each of m and n is 1.

7. A dye of the formula (II)

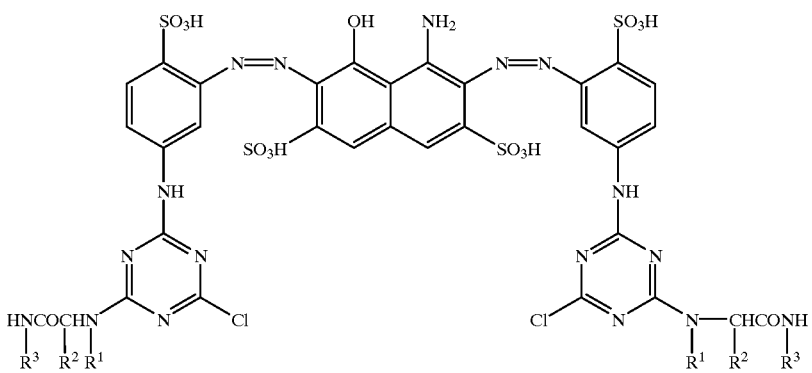

(II)

wherein each of $R^1$, $R^2$ and $R^3$ is as defined in claim 1.

8. A dye according to claim 7, wherein each of $R^1$, $R^2$ and $R^3$ is:

| $R^1$ | $R^2$ | $R^3$ |
|-------|-------|-------|
| H     | H     | H     |
| i-Pr  | H     | H     |
| Me    | H     | H     |
| Et    | H     | H     |
| Et    | Me    | H     |
| Me    | Me    | H     |
| Me    | H     | Me    |
| Me    | H     | Et    |
| H     | H     | Me    |
| Et    | H     | Et; or |
| Et    | H     | Me    | wherein Me is methyl, Et is ethyl and i-Pr is isopropyl.

9. A method of preparing a dye of the formula (I), given and defined in claim 1, which method comprises reacting a dyebase of the formula (III)

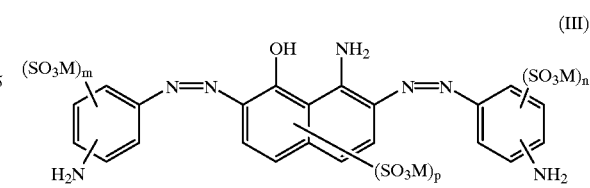

(III)

wherein $SO_3M$, m, n and p are as defined in claim 1, with a triazine of the formula (IV)

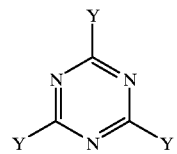

(IV)

where Y is as defined in claim 1, to form a bis-triazinylamino dye of the formula (V)

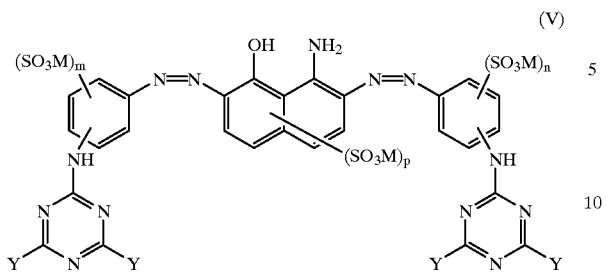

wherein $SO_3M$, m, n, p and Y are as defined in claim 1, and then reacting the bis-triazinylamino dye (V) with a carbamoylalkylamine of the formula (VI)

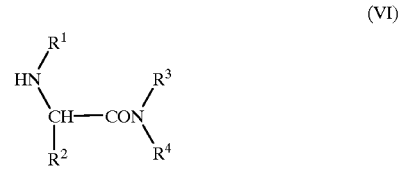

wherein $R^1$, $R^2$, $R^3$ and $R^4$ are as defined in claim 1.

10. A process for the colouration of a substrate, which process comprises applying to the substrate a dye according to.

11. A process according to claim 10, wherein the dye is applied to the substrate by exhaust dyeing, padding or printing.

12. A process according to claim 11, wherein the dye is applied to a cellulosic material at a pH above 7.

* * * * *